USOO6145029A

United States Patent [19]
Deschepper et al.

[11] Patent Number: 6,145,029
[45] Date of Patent: Nov. 7, 2000

[54] COMPUTER SYSTEM WITH ENHANCED DOCKING SUPPORT

[75] Inventors: Todd Deschepper, Spring; Paul Stanley, The Woodlands, both of Tex.

[73] Assignee: Compaq Computer Corporation, Houston, Tex.

[21] Appl. No.: 09/042,327

[22] Filed: Mar. 13, 1998

[51] Int. Cl.[7] .................................................. G06F 13/14
[52] U.S. Cl. ............................................. 710/36; 710/128
[58] Field of Search .............................. 710/36, 107, 126, 710/128, 129

[56] References Cited

U.S. PATENT DOCUMENTS

| | | | |
|---|---|---|---|
| 5,313,596 | 5/1994 | Swindler et al. | 395/325 |
| 5,499,346 | 3/1996 | Amini et al. | 395/308 |
| 5,568,621 | 10/1996 | Wooten | 395/292 |
| 5,625,829 | 4/1997 | Gephardt et al. | 395/800 |
| 5,634,073 | 5/1997 | Collins et al. | 395/825 |
| 5,752,043 | 5/1998 | Suzuki | 395/737 |
| 5,802,269 | 9/1998 | Poisner et al. | 395/183.2 |
| 5,818,691 | 10/1998 | McMahan et al. | 361/686 |
| 5,822,547 | 10/1998 | Boesch et al. | 395/283 |
| 5,875,307 | 2/1999 | Ma et al. | 395/281 |
| 5,878,211 | 3/1999 | Delagrange et al. | 395/186 |
| 5,878,237 | 3/1999 | Olarig | 395/308 |
| 5,878,272 | 3/1999 | Yanagisawa et al. | 395/823 |
| 5,884,049 | 3/1999 | Atkinson | 395/281 |
| 5,889,964 | 3/1999 | Cho et al. | 395/281 |
| 5,890,004 | 3/1999 | Poisner | 395/750.01 |

*Primary Examiner*—Glenn A. Auve
*Assistant Examiner*—Jigar Pancholi
*Attorney, Agent, or Firm*—Conley, Rose & Tayon, P.C.; Michael F. Heim; Jonathan M. Harris

[57] ABSTRACT

A computer system including a programmable bridge logic device to disable various peripheral device functions is disclosed. The bridge logic device preferably includes an address decoder and one or more peripheral bus controllers. The address decoder preferably includes a configuration disable unit comprising one or more programmable status bits. Each status bit is associated with a particular peripheral device function, such as a IDE or USB functions. When a status bit is set, configuration cycles to the function corresponding to that bit are disabled. In one aspect of the invention, the computer system comprises a laptop computer that can be docked to an expansion base. The laptop and the expansion base may duplicate one or more functions. When docked, the status bit in the bridge device associated with a function also provided in the expansion base is set disabling the duplicate function in the laptop in favor of the function in the expansion base. In this manner, only the peripheral device function in the expansion base is enabled, avoiding confusion to the computer system. When the bridge device receives a configuration cycle targeting a peripheral device function, the address decoder determines whether the status bit associated with that function is set. If the bit is indeed set, indicating that function is disabled in favor of expansion base, the bridge device does not claim the cycle. The CPU, or other device that initiated the cycle determines that the cycle has not been claimed by the bridge device and tries the cycle on the expansion base. If that function is available in the expansion base, then the CPU enables that expansion base peripheral for operation.

20 Claims, 2 Drawing Sheets

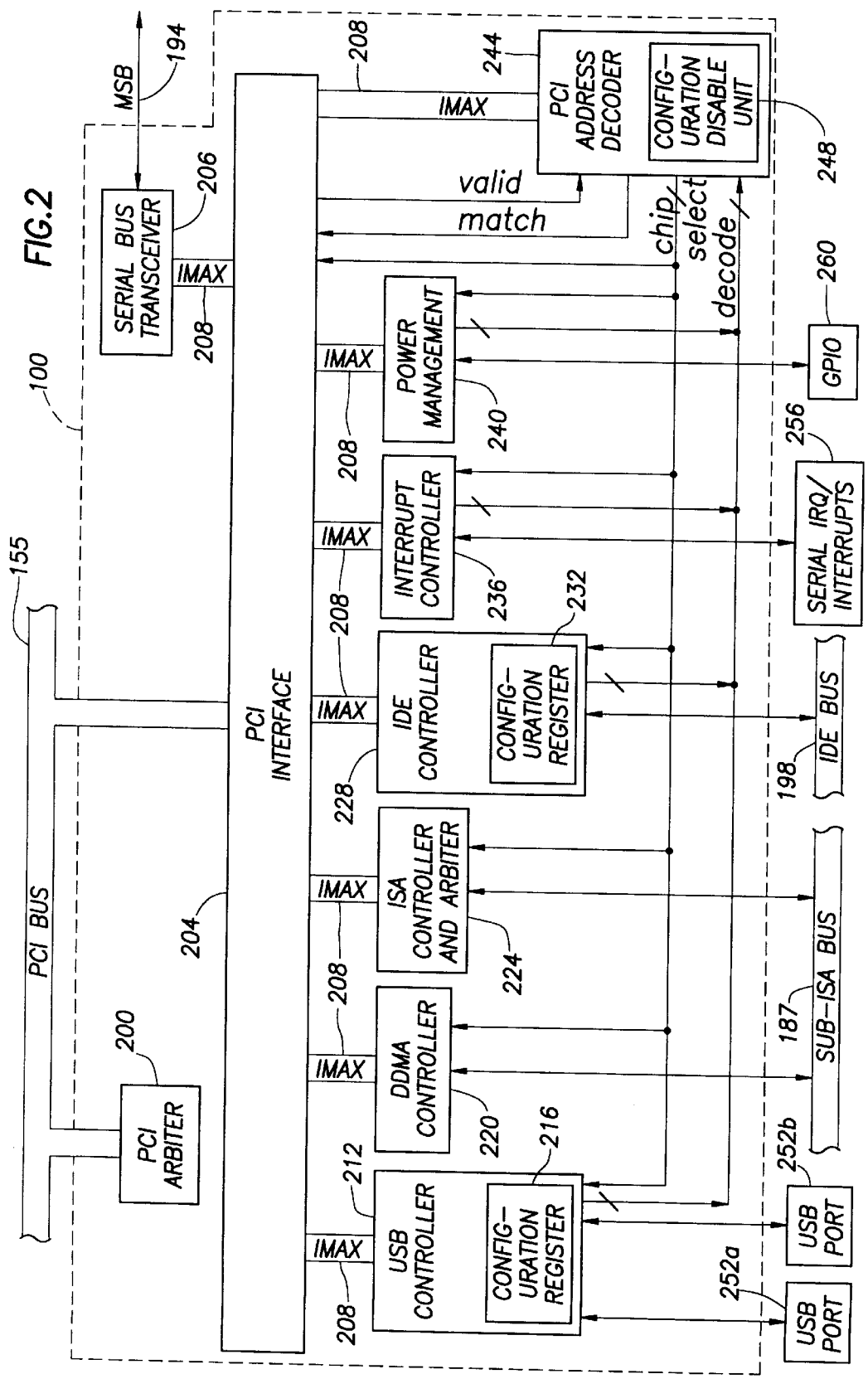

COMPUTER SYSTEM WITH ENHANCED DOCKING SUPPORT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to interfacing personal computer systems, and in particular to portable computers with docking stations. More particularly, the present invention relates to the manner and techniques by which computer systems manage internal peripheral devices when interfacing with docking stations. Still more particularly, the invention relates to a computer system adapted to interface to a fully functional docking station without causing internal peripheral bus conflicts.

2. Background of the Invention

A personal computer system includes a number of modular components with specialized functions that cooperatively interact to realize the many features of modern computer systems. The ability of these various components to exchange data and other signals is vital to the successsful operation of a computer system. One of the critical requirements in designing a new computer system is that all system components (including those that may be added to the system by a user) must be compatible. A component is compatible if it effectively communicates and transfers data without interfering or contending with the operation of other system components.

As an example, some of the early computer systems included a processor (or CPU), random access memory (RAM), and certain peripheral devices such as a floppy drive, a keyboard and a display. These components typically were coupled together using a network of address, data and control lines, commonly referred to as a "bus." As computer technology evolved, it became common to connect additional peripheral devices to the computer through ports (such as a parallel port or a serial port), or by including the peripheral device on the main system circuit board (or "motherboard") and connecting it to the system bus. One early bus that still is in use today is the Industry Standard Architecture (ISA) bus. The ISA bus, as the name implies, was a bus standard adopted by computer manufacturers to permit the manufacturers of peripheral devices to design devices that would be compatible with most computer systems. The ISA bus includes 16 data lines and 24 address lines and operates at a clock speed of 8 MHz. A large number of peripheral components have been developed over the years to operate with the ISA protocol.

The components which couple to a given bus receive data from the other components on the same bus via the bus signal lines, and selected components may operate in turn as "bus masters" to send data to other components over the bus. Accordingly, each component on the bus circuit operates according to a protocol associated with that bus which defines the purpose of each bus signal and regulates such parameters as bus speed and arbitration between components requesting bus mastership. A bus protocol also determines the proper sequence of bus signals for transferring data over the bus. As computer systems have continued to evolve, new bus circuits offering heightened functionality have replaced older bus circuits, allowing existing components to transfer data more effectively.

One way in which the system bus has been made more effective is to permit data to be exchanged without the assistance of the CPU. To implement this design, a new bus architecture called Extended Industry Standard Architecture (EISA) was developed. The EISA bus protocol permits system components residing on the EISA bus to obtain mastership of the bus and to run cycles on the bus independently of the CPU. Another bus that has become increasingly popular is the Peripheral Component Interconnect (PCI) bus. Like the EISA bus, the PCI bus has bus master capabilities. The PCI bus operates at clock speeds of 33 MHz or faster. Current designs contemplate implementing a 66 MHz PCI bus.

If other secondary expansion buses are provided in the computer system, another bridge logic device typically is used to couple the PCI bus to that expansion bus. An example of such bridge logic is described in U.S. Pat. No. 5,634,073, assigned to Compaq Computer Corporation.

The Integrated Drive Electronics (IDE) bus is commonly implemented as a secondary bus to interface mass storage devices such as hard disk drives, floppy disk drives, and CD ROM drives. Although newer and more powerful bus architectures like the PCI bus and the Small Computer Systems Interface (SCSI) bus are capable of supporting mass storage peripherals, the IDE bus remains the most widely-adopted bus architecture for mass storage devices in personal computer systems. An IDE controller can support a maximum of up to two IDE devices. If two IDE devices connect to one IDE controller, one device is designated as the "master" and the other as the "slave," according to the IDE protocol. Also, if two IDE controllers are incorporated simultaneously into the same computer, one bus controller is designated as the "primary" with the other as the "secondary." The master/slave and primary/secondary designations facilitate the complex negotiations between multiple IDE devices and buses.

Some computers incorporate a multi-bay device connected to the IDE bus. A multi-bay configuration typically includes a plurality of independent bays connected in any master/slave, primary/secondary configuration and may support "hot-plugging" of IDE devices in the bays, or the ability to connect and disconnect these devices even while the computer is powered on.

One other type of bus architecture, the Universal Serial Bus (USB), typically supports peripheral devices external to the computer, such as video cameras, modems, joysticks, a keyboard and mouse, and other input/output devices via a special USB connector external to the computer chassis. In fact, although as many as 127 different USB devices may be daisy-chained together from one USB port, some computer designs feature connections to multiple USB ports. In addition to simultaneously supporting a large number of peripheral devices, USB also supports hot plugging of peripheral devices. A Universal Serial Bus operates using a central USB controller to arbiter and route all bus traffic. Though a computer may incorporate multiple USB ports, only one USB controller is necessary.

Some laptop computer systems are designed to connect to a docking station, also known as an expansion base. An expansion base is not actually a part of the laptop computer system per se, but is a separate unit that accommodates the laptop. The laptop electrically connects to the expansion base usually by way of a PCI bus, although other bus protocols are contemplated. Because of inherent size and weight restrictions, laptop computers tend to require design tradeoffs such as small keyboards and graphics displays, crude tracking devices, and a limited number of mass storage devices. The expansion base includes peripheral devices, such as a CD ROM drive and a keyboard, and thus turns the laptop computer into a desktop system. Accordingly, the laptop user can access valuable features such as additional peripheral components including a large graphics display, a traditional mouse and full-size keyboard, hard and floppy disk drives, CD ROM drives, Digital Video Disk (DVD) drives, and other peripheral components. An expansion base may also offer connections to a local area network (LAN), printer, and modem. Although intended primarily for desktop operation, the utilization of expansion bases has greatly enhanced the usability and comfort of laptop computer systems, especially when the laptop is used frequently in one location, such as in the home or office.

Because an expansion base duplicates some functions of a laptop computer, such as providing an additional hard drive, for example, the laptop must be designed to adjust for any incompatibilities with the expansion base devices. The Windows 95 Plug-and-Play standard, for instance, does not support more than two IDE controllers in one computer system. Hence, docking a multi-bay laptop with an expansion base may cause a conflict between the laptop primary IDE controller, the laptop secondary IDE controller, and the expansion base IDE controller. As a result, current computer designs must sacrifice either on the IDE controller in the laptop or the IDE controller in the expansion base. If the expansion base is designed without an IDE bus, then the laptop IDE devices which require loading magnetic media (i.e., CD's and floppy disks) may not be accessible while the laptop is docked. If the laptop is designed without a secondary IDE controller, however, it typically cannot offer the multi-bay configuration to support such peripherals as CD ROM and DVD drives, due to size and weight restrictions.

In addition, unexpected results may occur when integrating different types of peripheral components that comprise modem computers, due to the complexity of these systems. Compounding the problem is that existing hardware designs can not always anticipate the specific requirements of future operating system software releases, the software at the heart of the computer. If new operating systems such as Windows 98, for example, place unanticipated restrictions on certain combinations of peripheral devices, the current laptop configurations may encounter even more conflicts with docking stations.

Despite the apparent advantages an expansion base can offer to many laptop computer systems, docking a laptop to such a device may result in conflicts between expansion base peripherals and some laptop components. As a result, the computer user is required to choose between the enhanced interface offered by the expansion base and the advanced functionality offered by certain peripheral devices. To date, no one has designed a computer system that overcomes these deficiencies.

SUMMARY OF THE INVENTION

Accordingly, the present invention discloses a computer system including a programmable bridge logic device to disable various peripheral device functions. In accordance with the preferred embodiment, the bridge logic device includes an address decoder and one or more peripheral bus controllers. The address decoder preferably includes a configuration disable unit comprising one or more programmable status bits. Each status bit is associated with a particular peripheral device function, such as a IDE or USB functions. When a status bit is set, the function corresponding to that bit is disabled.

In one aspect of the invention, the computer system comprises a laptop computer that can be docked to a docking station (also referred to as an expansion base). The laptop and the expansion base may duplicate one or more functions. For example, both units may include an IDE-based hard drive or a USB-based keyboard. When docked, the status bit in the bridge device associated with a function also provided in the expansion base is set disabling the duplicate function in the laptop in favor of the function in the expansion base. In this manner, only one hard drive or keyboard is enabled, avoiding confusion to the computer system.

When the bridge device receives a cycle such as a configuration cycle targeting a peripheral device function, the address decoder determines whether the status bit associated with that function is set. If the bit is indeed set, indicating that function is disabled in favor of the comparable function in the expansion base, the bridge device does not claim the cycle. Instead, if the expansion base comprises that peripheral device function, the CPU will target that function in the expansion base.

These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of the preferred embodiment is considered in conjunction with the following drawings, in which:

FIG. 2 is a block diagram of a South bridge device constructed in accordance with the preferred embodiment of the present invention and supporting an expansion base.

Figure 1:
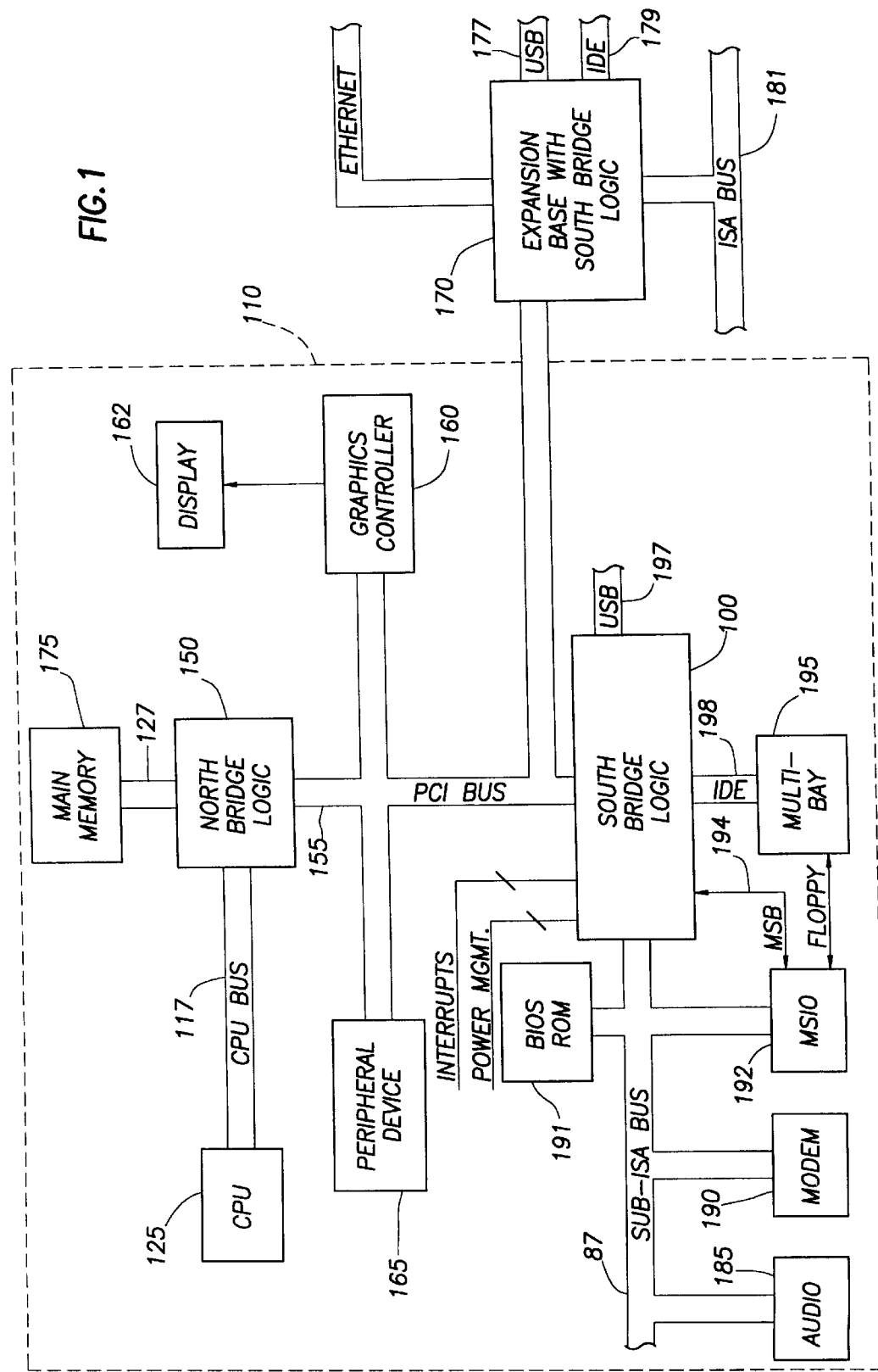
FIG. 1 is a block diagram of a computer system constructed in accordance with the preferred embodiment of the invention and coupled to an expansion base.

The following detailed description describes the preferred embodiment for implementing the underlying principles of the present invention. One skilled in the art should understand, however, that the following description is meant to be illustrative of the present invention, and should not be construed as limiting the principles discussed herein. In addition, certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection or through an indirect electrical connection via other devices and connections.

DETAILED DESCRIPTION OF PREFERRED EMBODIMENTS

Referring now to FIG. 1, a computer system 110 constructed in accordance with the preferred embodiment generally includes a processor or CPU 125 coupled to a main memory array 175 and a variety of other peripheral computer system components through an integrated bridge logic device 150. As depicted in FIG. 1, the bridge logic 150 sometimes is referred to as a "North bridge" simply because it is shown at the upper end of the drawing. The CPU preferably couples to bridge logic 150 via a CPU bus 117, or the bridge logic 150 may be integrated into the CPU 125. The CPU 215 may comprise, for example, a Pentium® II microprocessor. It should be understood, however, that other alternative types of microprocessors could be used. Further, an embodiment of computer system 110 may include multiple processors, with each processor coupled through the CPU bus 117 to the bridge logic unit 150.

The main memory array 175 preferably couples to the bridge logic unit 150 through a memory bus 127, and the bridge logic 150 preferably includes a memory control unit (not shown) that controls transactions to the main memory 175 by asserting the necessary control signals during memory accesses. The main memory 175 functions as the working memory for the CPU 125 and generally includes a conventional memory device or array of memory devices in which application programs and data are stored. The main memory array may comprise any suitable type of memory such as dynamic random access memory ("DRAM") or any of the various types of DRAM devices such as synchronous dynamic random access memory ("SDRAM"), Rambus™ dynamic random access memory ("RDRAM"), or extended data out dynamic random access memory ("EDO DRAM").

The computer system 110 also preferably includes a graphics controller 160 that couples to the bridge logic 150 via an expansion bus 155 as shown in FIG. 1. Alternatively, the graphics controller 160 may couple to bridge logic 150 through an Advanced Graphics Port ("AGP") bus (not specifically shown). As one skilled in the art will understand, the graphics controller 160 controls the rendering of text and images on a display device 162. The graphics controller 160 may embody a typical graphics accelerator generally known in the art to render three-dimensional data structures on display 162. These data structures can be effectively shifted into and out of main memory 175 via the expansion bus and bridge logic 150. The graphics controller 160 therefore may be a master of the expansion bus (including either PCI or AGP bus) enabling the graphics controller 160 to request and receive access to a target interface within the bridge logic unit 150, including the memory control unit. This mastership capability permits the graphics controller 160 to access main memory 175 without the assistance of the CPU 125. A dedicated graphics bus accommodates rapid retrieval of data from main memory 175. As will be apparent to one skilled in the art, the bridge logic 150 includes a PCI interface to permit master cycles to be initiated and received by bridge logic 150. If an AGP bus is included in the system, the bridge logic 150 also includes an interface for initiating and receiving cycles to and from components on the AGP bus.

The display 162 comprises any suitable electronic display device upon which an image or text can be represented. A suitable display device may include, for example, a cathode ray tube ("CRT"), a liquid crystal display ("LCD"), a thin film transistor ("TFT"), a virtual retinal display ("VRD"), or any other type of suitable display device for a computer system.

In the preferred embodiment, the expansion bus 155 comprises a Peripheral Component Interconnect (PCI) bus. The present invention, however, is not limited to any particular type of expansion bus, and thus various buses may be used including a high speed (66 MHz or faster) PCI bus. In the preferred embodiment, a plurality of PCI peripheral devices may reside on the PCI bus 155. The PCI devices may include any of a variety of peripheral devices such as, for example, network interface cards (NIC's), video accelerators, audio cards, hard or floppy disk drives, PCM-CIA drives, Small Computer Systems Interface ("SCSI") adapters and telephony cards. Although only one PCI peripheral device 165 is depicted in FIG. 1, it should be recognized that computer system 110 may include any number of PCI devices as desired.

The following discussion describes the preferred embodiment of computer system 110 for a laptop computer that can be connected to an expansion base 170 via the PCI bus 155. This should not be construed as limiting the present invention to a laptop. The present invention also may be used with a desktop system, work station, server, or handheld computer. In addition and as mentioned above, computer system 110 can be implemented with respect to the particular bus architectures shown in FIG. 1 (i.e., PCI bus), or other bus architectures, as desired. The embodiment described herein, however, assumes bus 155 represents a PCI bus, as shown in FIG. 1, and thus the following discussion will focus on configuring the present invention for that embodiment. Further, CPU 125 preferably comprises a Pentium® II processor and thus CPU bus 117 represents a Pentium II bus®. These bus protocols and the terminology used with respect to these protocols are well known to those of ordinary skill in the art. If a more thorough understanding of the PCI, or Pentium® II bus is desired, reference should be made to the *PCI Local Bus Specification* (1993), and *Intel P6 External Bus Specification*. If an AGP bus also is used in the computer system, reference may be made to the *Accelerated Graphics Port Interface Specification* (Intel, 1996).

Referring still to FIG. 1, another bridge logic device 100 also preferably connects to expansion bus 155. This bridge logic device 100 (which sometimes is referred to a "South bridge") couples or "bridges" the primary expansion bus 155 to other secondary expansion buses. These other secondary expansion buses may include an ISA (Industry Standard Architecture) bus, a sub-ISA bus, a USB (Universal Serial Bus), an IDE bus, an IEEE 1394 standard (or "fire wire") bus, or any of a variety of other buses that are available or may become available in the future. In the preferred embodiment of FIG. 1, the South bridge logic 100 couples to a sub-ISA bus 187, a USB bus 197, and an IDE bus 198.

As will be apparent to one skilled in this art, various peripheral devices may be coupled to each of these buses. Thus, as shown in the preferred embodiment of FIG. 1, a Mobile Super I/O (MSIO) chip 192 connects to the sub-ISA bus 87, as does an audio card 185, modem 190 and BIOS ROM 191. A Mobile Super I/O Bus (MSB) 194 further couples the South bridge 100 to the MSIO 194, providing a bidirectional serial data connection for exchanging power control and other status information. According to the preferred embodiment, a multi-bay configuration 195 couples to the IDE bus 198 and to the MSIO 192. The multi-bay configuration 195 preferably includes three independent bays connected in any master/slave, primary/secondary configuration supporting hot-plugging of IDE devices in the bays. As one skilled in the art will understand various IDE devices are available including CD ROM drives, floppy drives, tape drives, and the like. The USB 197 supports various peripherals, including video peripherals such as video cameras for teleconferencing purposes. In addition to the buses discussed above, the South bridge also preferably connects to interrupt signal lines, power management signal lines, and a MSB (MSIO Serial Bus).

As noted above, the computer system 110 preferably comprises a laptop computer. To facilitate use of the computer system 110 within a traditional desktop environment, an expansion base 170 preferably is available for connecting the laptop computer system to additional peripheral devices and to a computer network via an Ethernet bus. The expansion base 170 may include any type of configuration, including a port replicator or docking station. The present invention envisions, however, that the expansion base also includes a South bridge logic (not shown specifically) for coupling components on the PCI bus to other components coupled to the expansion base. Thus, as shown in FIG. 1, a South bridge logic device within the expansion base 170 couples the PCI bus to various expansion buses including an ISA bus 181, USB 177, and IDE bus 179. The following discussion focuses on the architecture of the South bridge logic 100. This same architecture may be used (with some minor modifications), if desired, for the South bridge logic within the expansion base 170. Alternatively, the present invention also may be implemented by using a prior art South bridge device in the expansion base 170.

FIG. 2 illustrates the preferred embodiment of South bridge logic 100, comprising a PCI interface 204, a serial bus transceiver 206, a PCI arbiter 200, a PCI address decoder 244, a USB controller 212, a Distributed Direct Memory Access (DDMA) controller 220, an ISA controller and arbiter 224, an IDE controller 228, an interrupt controller 236, and a power management engine 240. Preferably, the PCI interface 204 and PCI arbiter 200 couple directly to the PCI bus 155. The USB controller 212, DDMA controller 220, ISA controller/arbiter 224, IDE controller 228, interrupt controller 236, and power management engine 240 (referred to hereafter as the "South bridge controllers") preferably couple to the PCI interface via the Internal Modular ASIC EXpansion (IMAX) bus 208, described more fully in copending application entitled "Computer System with Bridge Logic that Includes an Internal Modular Expansion Bus and a Common Target Interface for Internal Target Devices" and "Computer System with Bridge Logic that Includes an Internal Modular Expansion Bus and a Common Master Interface for Internal Master Devices," assigned to Compaq Computer Corp. and included herein by reference. It should be understood, however, that there may be numerous other methods of interconnecting the South bridge controllers.

The PCI address decoder 244 further asserts chip select signals to each of the South bridge devices and receives decode signals from the USB controller 212, IDE controller 228, interrupt controller 236, and power management engine 240. In addition, the PCI address decoder 244 receives a valid signal from the PCI interface 204 and asserts a match signal to the PCI interface 204 to claim the cycle on the PCI bus. The serial bus transceiver 206 preferably couples to the PCI interface 204 via the IMAX bus 208, as well.

Also shown in FIG. 2 are buses and other signals external to the South bridge 100, including the PCI bus 155, sub-ISA bus 187, IDE bus 198, USB ports 252a and 252b, serial IRQ/interrupt lines 256, General Purpose input/output (GPIO) signals 260, and Mobile Super I/O bus (MSB) 194. As shown, the USB controller 212 couples to USB ports 252a and 252b and the DDMA controller 220 and ISA controller/arbiter 224 couple to the sub-ISA bus 187. Further, the IDE controller 228 couples to the IDE bus 198, and the interrupt controller 236 couples to the serial IRQ/interrupt lines 256. The power management engine 240 couples to the GPIO signals 260. Likewise, the serial bus transceiver 206 couples to the MSB 194. While the GPIO signals 260 preferably transmit and/or receive signals related to power management functions, such as activation signals received from a power or suspend button, the GPIO signals 260 may be used for any desired input/output signals. Note that a South bridge 100 constructed according to alternative embodiments may support different combinations of external buses and signals, including those buses and signals illustrated in FIG. 2 as well as others not specifically described herein.

The USB controller 212 preferably manages one or more USB ports 252 in accordance with the USB protocol. Two such ports 252a and 252b are illustrated in FIG. 2, but additional ports may be included as well. The USB controller 212 preferably includes a configuration register 216 which stores standard configuration and address information associated with the USB 197 and with devices coupled to the USB ports 252a and 252b. Preferably, the configuration register 216 is initialized at startup and may be changed by the computer operating system during normal operation. The address information stored in the configuration register 216 determines the values of the decode signals which the USB controller 212 asserts to the PCI address decoder 244, as discussed below. USB devices preferably are capable of responding to cycles from the PCI bus 215 via the PCI interface 204. According to standard methods, PCI cycles which target a USB device require access to the USB configuration register 216.

The IDE controller 228 preferably manages the IDE bus 198 and supports any combination of primary/secondary and master/slave IDE devices. Similarly, the IDE controller 232 also includes a configuration register 232 which stores standard configuration and address information associated with the IDE bus 198 and with IDE devices. Preferably, the configuration register 232 is initialized at startup and may be changed by the computer operating system during normal operation. The address information stored in the configuration register 216 determines the values of the decode signals which the USB controller 212 asserts to the PCI address decoder 244, as discussed below. According to standard methods, PCI cycles which target an IDE device require access to the IDE configuration register 232.

The DDMA controller 220 and ISA controller/arbiter 224 cooperate to manage cycles on the sub-ISA bus 187. The DDMA controller 220 preferably supports 8 or 16-bit DMA transfers to memory on the PCI bus 155 and provides status signals to the ISA controller/arbiter 224. When the DDMA controller 220 has control of the sub-ISA bus 187, the ISA controller/arbiter 224 translates all DMA commands from the PCI bus 155 into appropriate ISA bus cycles.

The interrupt controller 236 preferably receives a variety of standard interrupt signals 256 generated externally to the South bridge 100. In response to these interrupts 256, which may include interrupt signals from a mouse or other tracking device, various external switches, and other selected expansion devices, the interrupt controller 236 asserts interrupts to the CPU 125. The interrupt signals preferably also include signals indicating when the computer system docks and undocks with an expansion base. The interrupt controller 228 preferably is capable of initiating System Management Interrupt (SMI) signals to communicate status and other standard information to the CPU 125.

The power management engine 240 provides an interface between the GPIO signals 260 and the PCI bus 155, through which the operating system preferably controls computer functions related to power management such as Advanced Configuration and Power Interface (ACPI) functions. The GPIO signals 260 provide both input and output signals that can be directed toward other devices in the computer system 110 or received from switches mounted on the computer chassis, for example. Also, peripheral devices such as a hard drive, floppy drive, or graphics display can be placed into a power-efficient mode via GPIO signals 260 after a period of inactivity. Similarly, the power management engine 240 can monitor the status of key input signals related to power management or other functions. The power management engine 240 preferably is capable of receiving PCI target cycles.

The serial bus transceiver 206 preferably includes various registers and other circuitry to transmit and receive data across the MSB 194. As described above, the MSB 194 allows the South bridge 100 and MSIO 192 to exchange data relating to power control and other status information. The MSB 194 is described in greater detail in copending application entitled "Computer System with Improved Serial Bus Scheme," assigned to Compaq Computer Corp.

The PCI arbiter 200 monitors traffic (i.e., cycles) on the PCI bus 155 and grants cycle requests to PCI masters according to the PCI protocol. It should be understood, however, that the PCI arbiter 200 alternatively may reside in other devices in the computer system 110. Accordingly, the PCI arbiter 200 receives requests to run PCI cycles from various devices on the PCI bus, including the South bridge controllers, which submit PCI requests via the IMAX bus 208. The PCI arbiter 200 selects one of the requesting masters and assigns the PCI cycle to that master according to known techniques. In the preferred embodiment, the PCI arbiter 200 selects a master from multiple requesting masters based upon a least recently used (LRU) arbitration scheme. Based on this protocol, after a master is granted mastership of the PCI bus 155, the bus is re-arbitrated and the current master is put on the bottom of the priority stack. Other arbitration schemes may be used instead of the LRU algorithm if desired without departing from the principles of the present invention. To select one of the South bridge controllers for writing data or submitting a cycle to the PCI interface 204, the address decoder 244 asserts chip select signals to the PCI interface 204. Accordingly, the PCI interface 204 allows one of the South bridge controllers to transmit PCI target data via the IMAX bus 208 according to the state of the chip select signals.

The PCI interface 204 monitors the PCI bus 155 to detect valid PCI bus cycles and asserts the valid signal to the address decoder 244 if a valid PCI cycle is detected. In the preferred embodiment, the PCI address decoder 244 is used to determine if the target device of a PCI cycle is associated with a South bridge controller. The address decoder 244 might determine that a particular PCI cycle is directed to a device coupled to the IDE bus 198 or USB 252, for example. If the current PCI cycle belongs to a device associated with one of the South bridge controllers, the address decoder 244 responds to the PCI interface 204 by asserting the match signal and also sends a chip select signal to the appropriate South bridge controller instructing that controller to capture the PCI cycle from the IMAX bus 208. Upon receiving the match signal, the PCI interface 204 responds to the PCI cycle using known methods to indicate that the PCI cycle was positively decoded as belonging to a South bridge device.

To permit the address decoder to detect PCI cycles directed toward specific devices, the USB controller 212, IDE controller 228, interrupt controller 236, and power management engine 240 each provide a bank of decode signals to the address decoder 244. These decode signals represent the PCI target addresses of devices handled by these controllers. Hence, upon receiving a valid PCI cycle, the address decoder 244 preferably compares the PCI target address to the address space encoded by the decode signals and asserts a chip select signal to the controller which has decode signals consistent with the PCI target address.

The present invention addresses the compatibility problems that arise when the computer system 110 docks to an expansion base comprising an IDE bus by properly incorporating a configuration disable unit 248 into the PCI address decoder 244. A preferred embodiment also allows for docking problems that may occur if the expansion base includes a Universal Serial Bus. The configuration disable unit 248 preferably comprises a register file that includes disable bits for selected peripheral device functions, such as IDE functions and/or USB functions. Generally, each of these peripheral device functions is controlled by one of the South bridge controllers shown in FIG. 2. If the disable bit associated with a given South bridge controller is set to logic "0," then the PCI address decoder 244 responds normally (by asserting the match signal) to PCI configuration cycles directed to that controller. If the disable bit associated with a given South bridge controller is set to logic "1," however, then the PCI address decoder 244 is prevented from asserting the match signal in response to PCI cycles that target that controller. Because completing PCI target cycles to USB and IDE devices requires access to the associated configuration registers 216 and 232, the South bridge can effectively ,"hide" these configuration registers by setting the corresponding disable bits. Thereafter, if the CPU 125 or other master device initiates a PCI configuration cycle to a USB or IDE target, the PCI address decoder 244 will refrain from asserting the match signal to claim the PCI cycle, causing the master device to abort the PCI configuration cycle. Although the USB 197 and IDE bus 198 preferably remain fully operational despite the state of the disable unit 248, the South bridge 100 prevents PCI configuration access to USB and/or IDE devices based on the values of the associated disable bits.

In one aspect of the invention, a laptop computer can be docked to the expansion base 170. The laptop and the expansion base may duplicate one or more functions. For example, both units may include an IDE-based hard drive or a USB-based keyboard. When docked, the disable bit in the bridge device associated with a function also provided in the expansion base is set disabling the function in the laptop in favor of the duplicate function in the expansion base. In this manner, only one hard drive or keyboard is enabled, avoiding confusion to the computer system.

Although the configuration disable register 248 preferably includes disable bits only for the USB controller 212 and IDE controller 228, it should be understood that other disable bits may be incorporated for other South bridge controllers, as desired. Further, because the disable bit associated with each particular South bridge controller preferably is independent of other disable bits within the configuration disable unit 248, each South bridge controller may be "hidden" from PCI cycles independently of all other controllers.

As described above, the interrupt controller 236 preferably receives interrupt signals 256 that indicate whether or not the computer is docked with the expansion base 170. If the computer 110 is not docked, then the South bridge preferably sets the disable bits corresponding to the USB controller 212 and IDE controller 228 to logic "0," allowing PCI cycles to reach the USB and IDE devices normally. If the computer 110 is docked, however, then the BIOS ROM 191 preferably sets the disable bits corresponding to the USB controller 212 and IDE controller 228 to logic "1" by running a cycle to the South bridge 100 over the sub-ISA bus 87. In response, the computer South bridge 100 blocks all PCI configuration cycles to USB and IDE devices within the computer system 110, causing the USB 197 and IDE bus 198 to appear to be absent from the computer 110 entirely. Because no IDE or USB devices are visible to the CPU 125 after docking, the operating system software will then enable the IDE and USB functions in the expansion base. As a result, no USB and IDE bus conflicts occur between the computer 110 and expansion base 170. Thereafter, the expansion base South bridge 170 permits PCI cycles to the expansion base USB and IDE devices as usual. Hence, the computer user may continue to utilize USB and IDE devices via the expansion base while docked but without incurring the bus conflicts normally associated with docking.

According to the preferred embodiment, the computer 110 may dock with the expansion base whether or not the computer is powered on. Accordingly, the BIOS ROM 191 preferably determines whether the computer 110 is docked when the computer is initialized or reset and instructs the South bridge 100 to set the disable bits accordingly. If the computer 110 powers up or is reset while docked, the South bridge 100 sets the disable bits to logic "1" to hide the USB and IDE controllers 212 and 228. If the computer is not docked when powered on, however, the disable bits are set to logic "0." Furthermore, if the BIOS ROM 191 detects (via the interrupt signals 256), that the computer 110 has docked with the expansion base 170 during normal computer operation, then the South bridge 100 preferably sets the disable bits to logic "1." Conversely, if the BIOS ROM 191 detects (also via interrupts 256) that the computer 110 is removed from the expansion base 170 during normal computer operation, the disable bits preferably are set to logic "0" to re-enable the USB and IDE functions.

Hence, the preferred embodiment of the present invention includes a computer having a South bridge logic that actively compensates for hardware incompatibilities with an expansion base. The resulting computer may be integrated with a wide range of peripheral devices without sacrificing the convenience of a docking station. Numerous variations and modifications will become apparent to those skilled in the art once the above disclosure is fully appreciated. It is intended that the following claims be interpreted to embrace all such variations and modifications.

What is claimed:

1. A computer system comprising:
   a CPU;
   a memory device coupled to said CPU that stores data and program instructions;
   a peripheral device coupled to said CPU via an expansion bus that responds to cycles from said CPU;
   a bridge device disposed between said CPU and said peripheral device that includes a status bit, and wherein when said status bit is set, said peripheral device is not allowed to respond to said CPU cycles.

2. The computer system of claim 1 wherein said bridge device includes an address decoder that includes said status bit.

3. The computer system of claim 2 wherein said address decoder includes two status bits, each status bit precluding a different peripheral device from responding to CPU cycles.

4. The computer system of claim 2 wherein said address decoder asserts a match signal to claim a CPU cycle.

5. The computer system of claim 4 wherein said address decoder prevents said match signal from being asserted if said status bit is set.

6. The computer system of claim 4 wherein said address decoder includes two status bits, each status bit precluding a different peripheral device from responding to CPU cycles, and said address decoder precludes said match signal from being asserted if either status bit is set.

7. The computer system of claim 1 wherein said peripheral device includes a disk drive.

8. The computer system of claim 2 wherein said address decoder includes a configuration disable unit including said status bit.

9. A bus bridge device, comprising:
   at least one controller coupled to a secondary expansion bus;
   an expansion bus interface coupled between a primary expansion bus and said controller; and
   an address decoder that responds to cycles on the primary expansion bus and claims cycles on said primary expansion bus by asserting a match signal, said address decoder including a status bit, and wherein when said status bit is set, said bridge device is not allowed to respond to a configuration cycle on said primary expansion bus targeting a function controlled by said bridge device.

10. The bridge device of claim 9 wherein said wherein said address decoder includes two status bits, each status bit precluding said bridge device from responding to primary expansion bus configuration cycles targeting a different function.

11. The bridge device of claim 10 wherein said address decoder prevents said match signal from being asserted if either status bit is set and said bridge device detects a primary expansion bus configuration cycle targeting a function associated with the status bit that is set.

12. The bridge device of claim 10 wherein said functions include an IDE function and a USB function.

13. A computer, comprising:
   a laptop computer including a CPU, a memory device coupled to said CPU that stores data and program instructions, a laptop peripheral device coupled to said CPU via an expansion bus that responds to cycles from said CPU, a bridge device disposed between said CPU and said laptop peripheral device that includes a status bit that when set prevents said laptop peripheral device from responding to said CPU cycles; and
   an expansion base including an expansion base peripheral device coupled to said CPU via said expansion bus.

14. The computer system of claim 13 wherein said bridge device includes two status bits associated with two different peripheral devices and the bridge device prevents a peripheral device from responding to CPU cycles when that peripheral device's associated status bit is set.

15. The computer system of claim 14 said laptop computer includes an IDE device and a USB device and said expansion base also includes an IDE device and a USB device, and wherein one status bit is associated with an IDE device and the other status bit is associated with a USB device.

16. A method of preventing conflicts between conflicts between peripheral devices in a computer system, comprising:
   setting a status bit corresponding to a function;
   detecting a cycle on an expansion bus;
   determining whether said cycle is associated with the function corresponding to said status bit;
   deasserting a match signal if said status bit is set and said cycle is associated with the function corresponding to said status bit.

17. A computer system, comprising:

a laptop computer including a CPU, a memory device coupled to said CPU that stores data and program instructions, a laptop disk drive coupled to said CPU via an expansion bus that responds to cycles from said CPU, a bridge device disposed between said CPU and said laptop disk drive that includes a status bit that when set prevents said laptop disk drive from responding to said CPU cycles;

an expansion base including an expansion base disk drive coupled to said CPU via said expansion bus; and said bridge device prevents said CPU from accessing said laptop disk drive in favor of said expansion base disk drive when said status bit is set.

18. A computer system, comprising:

a laptop computer including a CPU, a memory device coupled to said CPU that stores data and program instructions, a laptop USB device coupled to said CPU via an expansion bus that responds to cycles from said CPU, a bridge device disposed between said CPU and said laptop USB device that includes a status bit that when set prevents said laptop USB device from responding to said CPU cycles;

an expansion base including an expansion base USB device coupled to said CPU via said expansion bus; and said bridge device prevents said CPU from accessing said laptop USB device in favor of said expansion base USB device when said status bit is set.

19. A computer system, comprising:

a laptop computer including a CPU, a memory device coupled to said CPU that stores data and program instructions, a laptop IDE device and a laptop USB device coupled to said CPU via an expansion bus that respond to cycles from said CPU, a bridge device disposed between said CPU and said laptop IDE device and laptop USB device that includes two status bits associated one each with the laptop IDE device and laptop USB device that when set prevents the associated device from responding to said CPU cycles;

an expansion base including an expansion base IDE device coupled to said CPU via said expansion bus; and said bridge device prevents the CPU from accessing said laptop IDE device in favor of said expansion base IDE device when said status bit associated with the laptop IDE device is set.

20. A computer system, comprising:

a laptop computer including, a CPU, a memory device coupled to said CPU that stores data and program instructions, a laptop IDE device and a laptop USB device coupled to said CPU via an expansion bus that respond to cycles from said CPU, a bridge device disposed between said CPU and said laptop peripheral device and laptop USB device that includes two status bits associated one each with the laptop IDE device and laptop USB device that when set prevents the associated device from responding to said CPU cycles;

an expansion base including an expansion base USB device coupled to said CPU via said expansion bus; and said bridge device prevents the CPU from accessing said laptop USB device in favor of said expansion base USB device when the status bit associated with said laptop USB device is set.

* * * * *